United States Patent [19]

Spitz et al.

[11] Patent Number: 5,444,797
[45] Date of Patent: Aug. 22, 1995

[54] METHOD AND APPARATUS FOR AUTOMATIC CHARACTER SCRIPT DETERMINATION

[75] Inventors: A. Lawrence Spitz, Palo Alto; David A. Hull, Standord, both of Calif.

[73] Assignees: Xerox Corporation, Stamford, Conn.; Fuji Xerox Corporation, Tokyo, Japan

[21] Appl. No.: 47,515

[22] Filed: Apr. 19, 1993

[51] Int. Cl.$^6$ .................. G06K 9/46; G06K 9/34
[52] U.S. Cl. .................. 382/192; 382/203; 382/224; 382/177
[58] Field of Search .............. 382/36, 39, 40, 9, 28, 382/26, 25, 16, 19, 10, 18

[56] References Cited

U.S. PATENT DOCUMENTS

| | | | |
|---|---|---|---|
| 3,755,780 | 8/1973 | Sammon et al. | 382/36 |
| 4,516,262 | 5/1985 | Sakurai | 382/18 |
| 4,802,230 | 1/1989 | Horowitz | 382/37 |
| 5,048,100 | 9/1991 | Kuperstein | 382/36 |
| 5,181,259 | 1/1993 | Rorvig | 382/6 |
| 5,253,307 | 10/1993 | Wayner et al. | 382/25 |

*Primary Examiner*—Joseph Mancuso
*Assistant Examiner*—Jon Chang
*Attorney, Agent, or Firm*—Oliff & Berridge

[57] ABSTRACT

An automatic script determining apparatus automatically determines the gross script-type of the text image of a document. A connected component generating means generates connected components from the pixels comprising the text image. A bounding box generating means generates a bounding box surrounding each connected component. A centroid determining means determines a centroid for each bounding box. A script feature determining means determines the locations, relative to the centroid, of one or more predetermined types of features, for each bounding box. A script determining means determines a distribution of the located script features for the entire text image, and compares the determined spatial distribution to predetermined distribution for at least one script-type to determine the script type of the text image.

24 Claims, 9 Drawing Sheets

原子核の質量は，

原子の質量の大部分を占めるので，

Fuji Xerox Palo Alto Laboratory
3400 Hillview Avenue
Palo Alto, CA 94304 USA

FIG.1

Fuji Xerox Palo Alto Laboratory
3400 Hillview Avenue
Palo Alto, CA 94304 USA

FIG.2

Fuji Xerox Palo Alto Laboratory
3400 Hillview Avenue
Palo Alto, CA 94304 USA

FIG.3

OF OCCURENCES
OF UPWARD
FACING CONCAVITIES

FIG. 5a

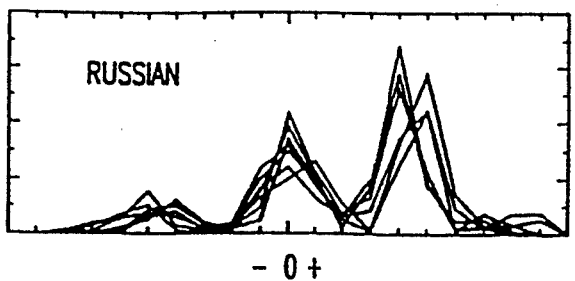

− 0 +
VERTICAL POSITION RELATIVE TO CENTROID

OF OCCURENCES
OF UPWARD
FACING CONCAVITIES

FIG. 5b

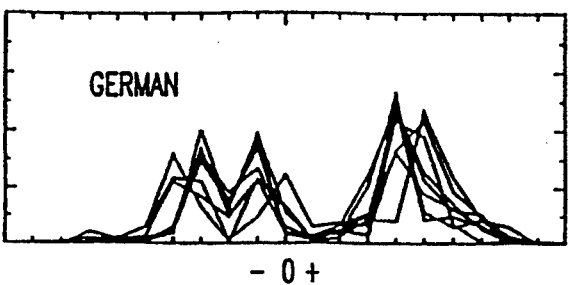

− 0 +
VERTICAL POSITION RELATIVE TO CENTROID

OF OCCURENCES
OF UPWARD
FACING CONCAVITIES

FIG. 5c

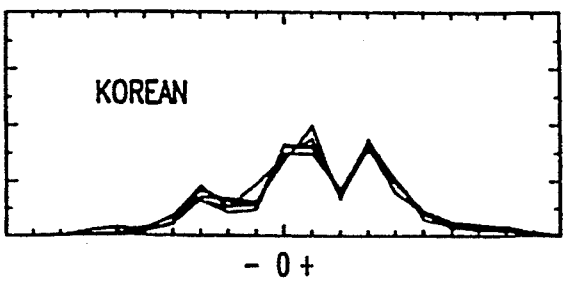

− 0 +
VERTICAL POSITION RELATIVE TO CENTROID

OF OCCURENCES
OF UPWARD
FACING CONCAVITIES

FIG. 5d

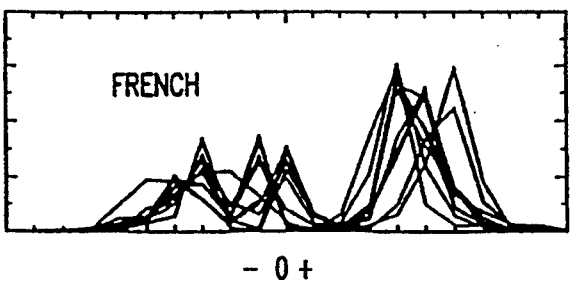

− 0 +
VERTICAL POSITION RELATIVE TO CENTROID

NOTE: IN EACH GRAPH, EACH SEPARATE LINE
REPRESENTS AN INDEPENDENT DOCUMENT

OF OCCURENCES
OF UPWARD
FACING CONCAVITIES

OF OCCURENCES
OF UPWARD
FACING CONCAVITIES

OF OCCURENCES
OF UPWARD
FACING CONCAVITIES

NOTE: IN EACH GRAPH, EACH SEPARATE LINE REPRESENTS AN INDEPENDENT DOCUMENT

METHOD AND APPARATUS FOR AUTOMATIC CHARACTER SCRIPT DETERMINATION

BACKGROUND OF THE INVENTION

1. Field of the Invention

The present invention relates to a method and apparatus for automatic document recognition and, more particularly, to a method for automatically determining the character script type(s) of the characters of the document.

2. Description of Related Art

Optical character recognition and the use of optical character recognition to convert scanned image data into text data suitable for use in a digital computer is well known. In addition, methods for converting scanned image data into text data and the types of errors such methods generate are well known. However, the proper selection of the character recognition method is highly dependent upon the script (alphabet or ideogram) used in the document. Further, the selection of a proper method for error correction is highly dependent upon the language of the document. Conventionally, the methods for optical character recognition and for error correction in optical character recognition systems have been provided on the assumption that the script and language used in the document is the "official" script and language of the country in which the system is being used. That is, in the United States, conventional optical character recognition systems would assume that the document is in English and uses Roman script, while in Japan, an applicable character recognition system would be implemented assuming that the language is Japanese and uses the Japanese scripts. Alternately, an optical character recognition system can be implemented with the character recognition and error resolution methods for a plurality of languages.

However, it has heretofore not been possible to have the optical character recognition system automatically determine the language of the document. Rather, as each document is provided to the optical character recognition system, some indication of the particular language and script of the document must be given to the optical character recognition system. This has been accomplished by either having the operator input data concerning the language and script of the document to the optical character recognition system, or by having the document provided with special markings which indicate the language and script of the document.

SUMMARY OF THE INVENTION

It is therefore an object of the present invention to provide an optical character recognition system having automated script and language recognition capabilities.

It is also an object of the present invention to provide a method for automatically determine the character script type of a document.

It is yet another object of the present invention to provide methods for determining the particular language of the document based on the determined script type.

It is a further object of the present invention to determine the character script type of a document based on script features.

According to a first embodiment of the method, a document is scanned, and all non-text information is removed. The resulting text image is then corrected for skew and other scanning artifacts (if necessary). Once the document image has been scanned and cleaned up, the image is converted from a bitmap of pixels having locations and image densities to a plurality of connected components. After generating the connected components, a bounding box is generated for each connected component and a centroid of the bounding box is determined. Then, the distribution around the centroid of a predetermined script artifact is determined. Based on the determined distribution of the character script feature, the script type of the language of the document is determined.

In a second preferred embodiment of the invention, the selected script feature is an upward opening concavity. A preferred method for locating such upward opening concavities is by finding black pass codes. In yet a further embodiment of the invention, a centroid of the bounding box is determined, and the distribution of the script feature relative to the centroid is determined.

BRIEF DESCRIPTION OF THE DRAWINGS

The invention is described in relation to the accompanying drawings, in which:

FIG. 1 shows an image of a document comprising a pair of sample text scripts, one in Roman script and one in an Asian script;

FIG. 2 shows bounding boxes for each connected component of the document shown in FIG. 1;

FIG. 3 shows the locations of the centroids for each of the connected components of FIG. 2;

DETAILED DESCRIPTION OF THE PREFERRED EMBODIMENTS

Figure 7:
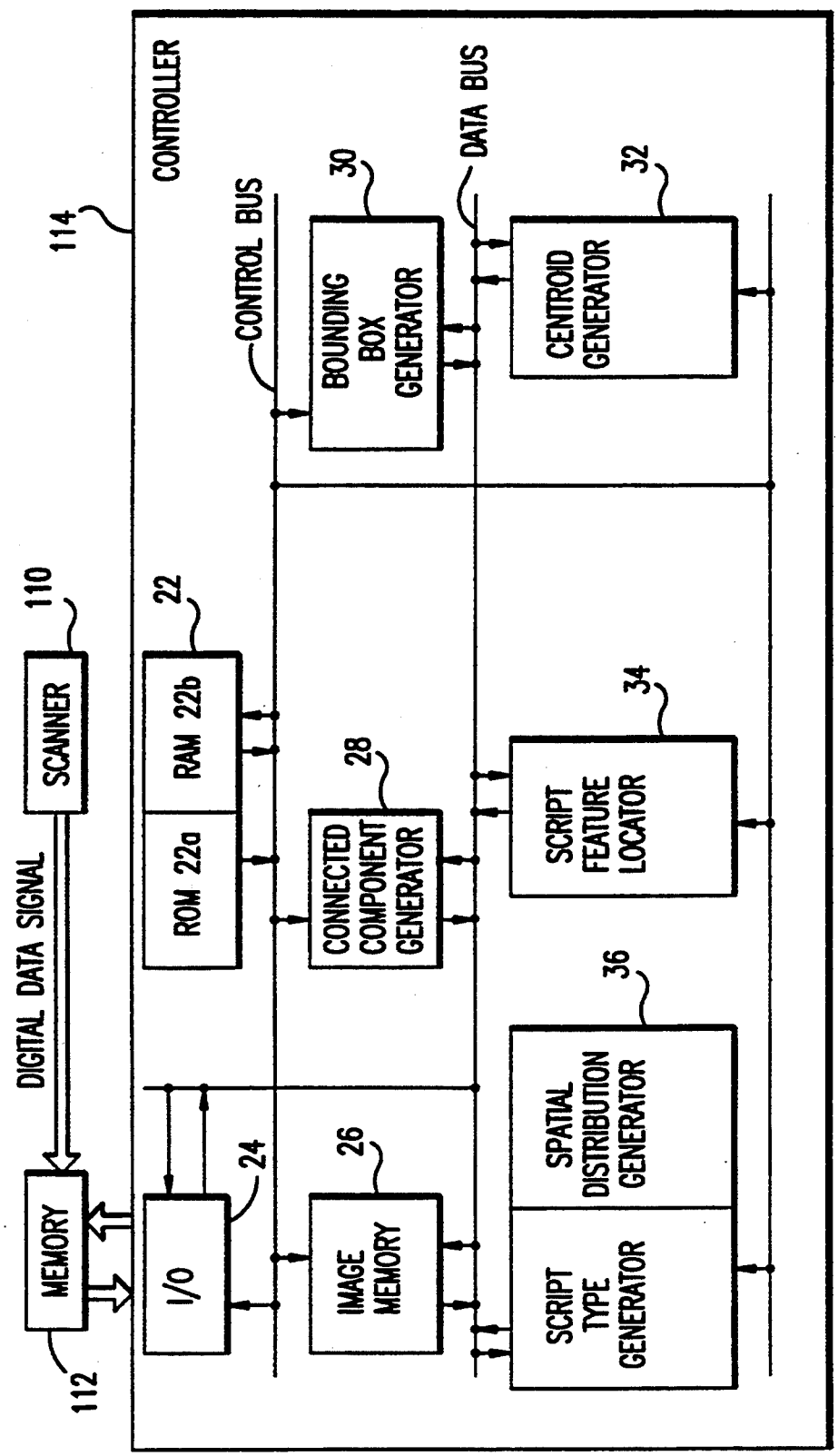
FIG. 7 shows a block diagram of an optical character recognition system.

As shown in FIG. 7, a conventional optical character recognition system comprises a scanner 110 having a charge coupled device (CCD) or the like. The scanner 110 scans a document 100 having an image 102, the image 102 comprising a text string of an unknown script and language, and outputs a digital data signal representative of the location and image density of a plurality of pixels comprising the image 102 of the original document 100. This digital data signal is sent to a memory 112, where it is stored temporarily or indefinitely. The digital data signal, when output from the memory 112, is input to a general purpose digital computer 114. Once input to computer 114, the digital data signal is first cleaned up by removing any non-text portions of the image 102, leaving a text portion 104. Further, any scanner artifacts or the digital data signal, such as skew or the like, are corrected for. The cleaned up digital data signal is then restored to the memory 112 or stored in a memory of the computer 114. Alternatively, the scanner can provide some of the preprocessing, such as removal of scanner artifacts.

As shown in FIG. 7, the general purpose digital computer 114 of the present invention comprises a memory 22 for storing a control program, an input/output circuit 24 for inputting the digital data signal from the memory 112 and for outputting a signal representative of the determined script type of the image 102. The general purpose computer 114 also comprises an image memory 26 for storing the digital data signal, a connected component generating means 28 for generating connected components from the digital data signal; bounding box generating means 30 for determining the coordinates of the bounding box and the pixels of the digitized image within the bounding box for each of the connected components; centroid determining means 32 for determining a centroid of each of the bounding boxes; feature determining means 34 for determining the spatial locations of one or more types of predetermined printer features for each of the bounding boxes; and a script determining means 36 for determining a script-type of the document. The memory 22 for storing the control program may comprise either a ROM 22a or a RAM 22b.

In operation, the document 100 containing the image 102, as shown in FIG. 1, is placed into and scanned by the scanner 110 to generate a serial or parallel digital data signal. The digital data signal comprises a plurality of signal portions, each portion representative of a corresponding pixel of the text portion 104 of the original image 102. Each pixel of the text portion 104 has a location in the text portion 104 and an image density. Accordingly, each signal portion of the digital data signal includes data representative of the location and image density of the corresponding pixel.

The digital data signal output by the scanner 110 is then stored in the memory 112. The memory 112 may comprise a RAM, a flash memory, a disk memory or the like. Regardless of the type of memory 112, the digital data signal is stored in the memory 112 in response to the location and image density data within each signal portion. Of course, it is understood that the digital data signal can be directly input to the general purpose digital computer 114, rather than into the intermediate memory 112. Alternately, the memories 22 or 26 of the general purpose digital computer 114 can be used in place of the memory 112. In any case, it is understood that the memory 112 is used to provide long-term storage of the image 102.

Once the operator has completed inputting documents into the scanner 110 or the system otherwise determines that the digital data signal representative of the text portion 104 should be converted to text data, the digital data signal representative of the text portion 104 is output from the memory 112 to the general purpose computer 114. It is of course understood that a special purpose digital computer or hardwired logic circuit can be used in place of the general purpose digital computer 114.

The digital image data signal stored in the memory 112 is output to the general purpose computer 114, where it is input through the input/output means 24 to the image memory 26. Once the digital data signal has been completely stored in the image memory 26, the digital data signal is then made available to the connected component generating means 28. As shown in FIG. 2, the connected component generating means 28 divides the digital data signal representative of the image 102 into a plurality of connected components, each connected component comprising one or more signal portions. Each connected component comprises signal portions corresponding to those pixels of the original text portion 104 which have a certain minimum image density and form a continuous path. Each script character generally corresponds to one connected component, as in the "F" of "Fuji" or more than one connected component, as in the "j" or "i" in "Fuji".

Once the connected component generating means 28 generates the plurality of connected components for the text portion 104 from the digital data signal, the digital data signal corresponding to the text portion 104 and the list of connected components generated by the connected component generating means 28 is output to the image memory 26 and the bounding box generating means 30.

The bounding box generating means 30 redivides the digital data signal representative of the text portion 104 into a plurality of bounding boxes, each bounding box containing one connected component and zero, one or more than one signal portion of the digital data signal adjacent to the signal portions comprising the connected component as shown in FIG. 2. The dimensions of each bounding box are determined by the location data of the leftmost, rightmost, uppermost and bottommost signal portions comprising the corresponding connected component. Accordingly, the signal portions within the bounding box are those comprising the connected component and those signal portions having a location data placing them within the boundaries of the bounding box, regardless of their image density data. Once the list of bounding boxes and the signal portions comprising each bounding box has been generated by the bounding box generating means 36, the list of bounding boxes and the corresponding signal portions is output to the image memory 26 and the centroid generating means 32.

The centroid generating means 32 determines a "center of mass" for each bounding box. That is, the centroid generating means determines lateral and longitudinal median lines, the intersection of the lateral and longitudinal median lines defining the centroid of the bounding box as shown in FIG. 3. Accordingly, the sum of the image densities of the signal portions above the lateral median line is equal to the sum of the image densities below the lateral median line; and the sum of the image densities to the left of each longitudinal median line is equal to the sum of the image densities of the signal portions to the right of the longitudinal median line.

Once the centroid generating means 32 has determined the centroid for each of the plurality of bounding boxes, the list of centroids is output to the memory 26, and the list of bounding boxes, the signal portions corresponding to each of the bounding boxes and the location of the centroid of each of the bounding boxes is output to the feature determining means 34. The feature determining means determines, for each bounding box, the presence and the location of one or more predetermined character features of the connected component corresponding to any particular bounding box in relation to the centroid for the corresponding bounding box. The types of features which may be determined by the feature determining means 32 are generally unlimited. The feature, can be, for example, upwardly facing concavities within the connected component (or connected components concavities centered along any reasonable direction of the bounding box); distributions of black passes (horizontal and vertical); distributions of white passes (horizontal and vertical); distributions of all passes (horizontal and vertical); shape measures (angular distribution of stroke thickness measured by sampling distance in a multitude of directions from a non-edge black pixel to the nearest white pixel); population proximity distribution of connected components; aspect ratio distribution of connected component bounding boxes; area distribution of connected component bounding boxes; density distribution of connected components (fraction of "on" pixels in rectangle); position of connected component tops and bottoms with respect to baseline; and projection profiles (pixels, number of connected components). However, upwardly facing concavities are preferably determined by the feature determining means. The preferable method for locating upward facing concavities is by locating "black pass codes". The inventors of the present application have determined that each black pass code corresponds to an upwardly opening concavity.

Figure 6:
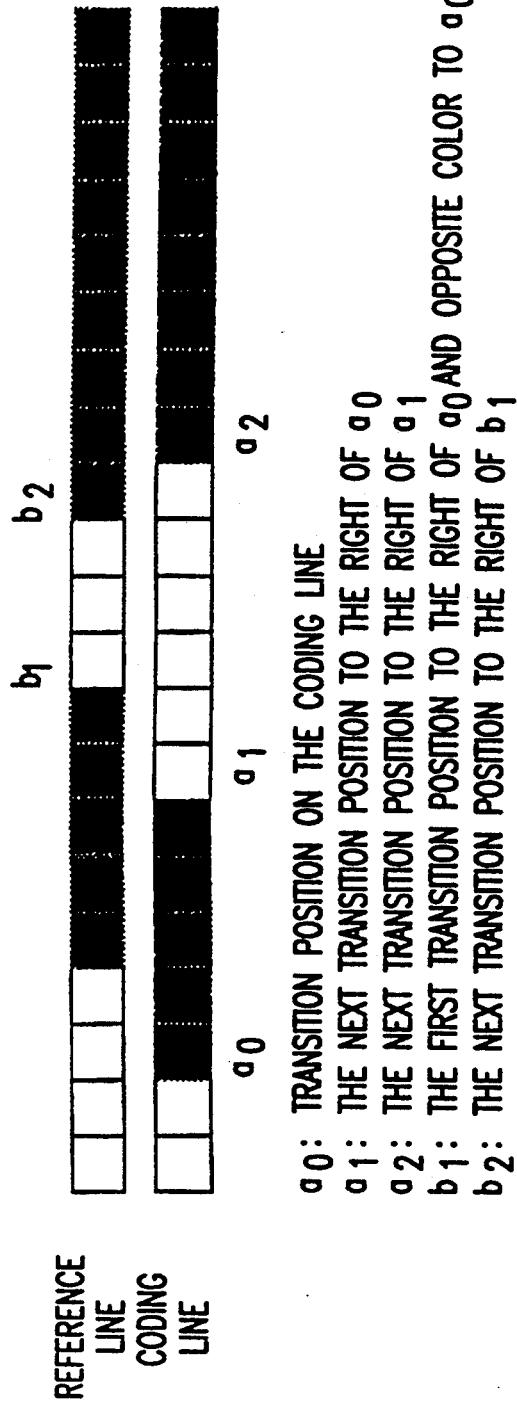
FIG. 6 shows a generalized form of the black pass type script feature shown in FIG. 4.
Figure 6:
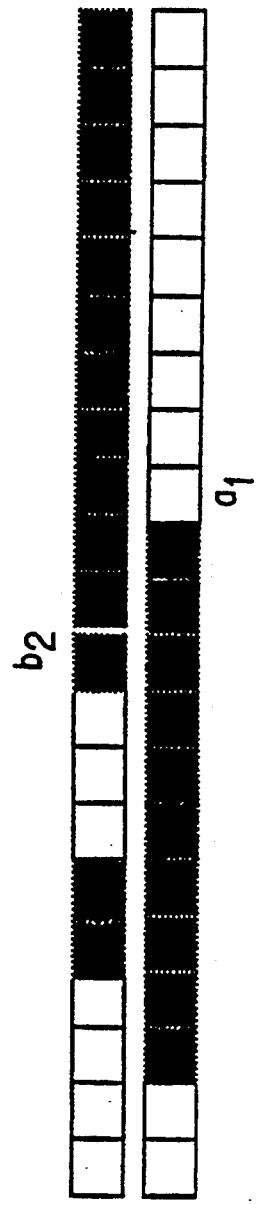

The black pass codes are one of a plurality of pass codes defined by CCITT Group III, 2-dimensional (T.4) and Group IV (T.6) Recommendations. Black pass codes, as shown in FIG. 6, are defined as particular transitions from a string of one or more signal portions having a first type of image density data to a string of one or more signal portions having a second type of image density data within a first or "coding" line, in relation to the location of the transitions from signal portions having the first type of image density data to signal portions having the second type of image density data in a previous or "reference" line. In the present invention, each line is defined as a set of signal portions representative of pixels located horizontally adjacent to each other across the width of a bounding box.

Figure 4:
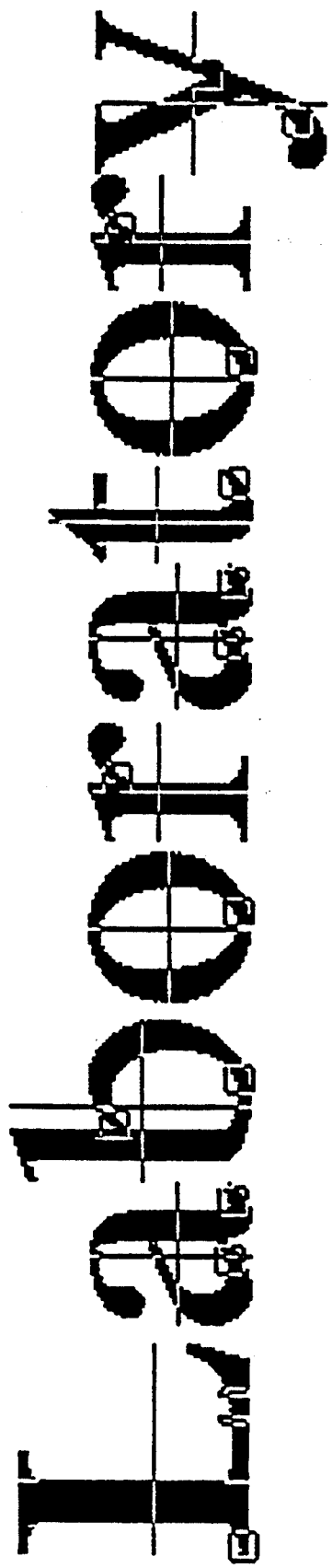
FIG. 4 shows the black pass type script feature of the connected components of FIG. 2.

In particular, the feature determining means 34 of the present invention determines when a first high image density to low image density transition occurs on the coding line to the right of a second low density to high density transition on the reference line. As shown in FIG. 4, such a transition indicates that an upwardly opening concavity occurs within the connected component corresponding to the bounding box under examination.

In the first preferred embodiment of the present invention, the feature determining means 34 locates black pass codes. Thus, all such upwardly opening concavities are located, and their vertical positions relative to the centroid of the corresponding bounding box are determined by the feature determining means 34. After the plurality of bounding boxes of the text portion 104 are examined and the upwardly opening concavities of the connected components within the plurality of bounding boxes are located and their positions relative to the corresponding centroids determined, as shown in FIG. 4, the feature determining means 34 outputs the list of the located upwardly opening concavities and their positions relative to their corresponding centroids to the memory 26 and the script determining means 36.

Figure 5E:
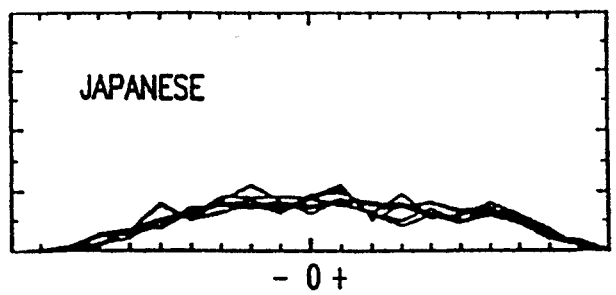
FIG. 5 shows the vertical distribution of the black pass type script feature relative to the centroid for a number of European and Asian languages.
Figure 5F:
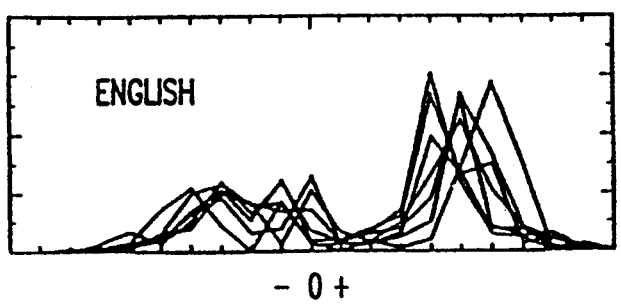
Figure 5G:
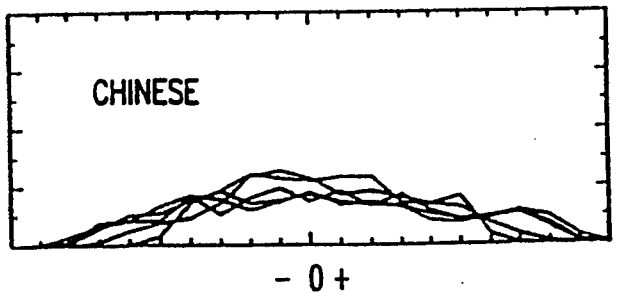

The script determining means 36 determines a spatial distribution, normalized to the centroid, for the character features determined by the feature determining means 34 and compares the determined spatial distribution to known spatial distributions for broad categories of script types. One skilled in the art could easily select from a number of possible methods to determine the script type by comparing the determined spatial distribution to the known spatial distributions. Linear discriminate analysis is one such method of comparing a spacial distribution to known spacial distributions. Additionally, least-squared means is another well-known method. The known spatial distributions are calculated beforehand by analyzing several documents for each of the respective script types to form the graphs of FIG. 5. The determined spatial distribution is then compared to each of the known spatial distributions to see which it most closely resembles. As shown in FIG. 5, European scripts, including Roman scripts and Cyrillic scripts have two or more distinct peaks in the spatial distribution, with at least one peak above the centroid and at least one peak below the centroid. In contrast, as shown in FIG. 5, the Asian scripts, including Chinese, Hangul and Japanese have a more continuous distribution which peaks near the centroid.

Because the method and apparatus of the present invention are statistically based, they are very robust and can withstand even a very poorly printed and/or scanned document. That is, it is not necessary for the digital data signal or the connected components generated from the digital data signal to perfectly represent every character of the document. Rather, the present invention is able to withstand such common scanning errors such as splitting a single connected component character into two or more connected components or merging two or more separate connected components into a single connected component.

Further, once the script is determined by the script determining means 36 as being European, the text portion 104 and/or the black pass code spatial distribution can be further analyzed to determine whether the text string of the text portion 104 is a Cyrillic script or a Roman script, and further, if the text string of the text portion 104 is a Roman script, whether the language represented by the text string of the text portion 104 is English, French or German. Additionally, if the script determining means 36 determines that the script is an Asian script, the script determining means 36 can roughly determine whether the script represents the Hangul (Korean) script or is either Chinese or Japanese script. However, the script determining means 36 cannot determine whether the script is Chinese or Japanese scripts, as these script groups have nearly identical spatial distributions.

Once the script determining means 36 has determined the script type, further processing can be applied to the digital data signal to raise the confidence level of the determination of the particular language, or the results of the script determining means 36 can be directly output to the optical character recognition system for selecting the optimal optical character recognition algorithms for the script and the language determined by the apparatus and method of the present invention.

In a second preferred embodiment of the invention, the centroid determining means 32 and the bounding generating means 30 can be selectively replaced or eliminated depending on the type of script feature to be located by the feature determining means 34. For example, if the feature determining means 34 determines the aspect ratio of the bounding box, the centroid determining means 32 is unnecessary and can be eliminated, while if the feature determining means 34 determines the shape measure, neither the bounding box generating means 30 or centroid determining means 32 is necessary. Accordingly, it is understood that the digital computer 114 will incorporate those means necessary to allow the feature determining means 34 to locate the selected features.

Figure 8:
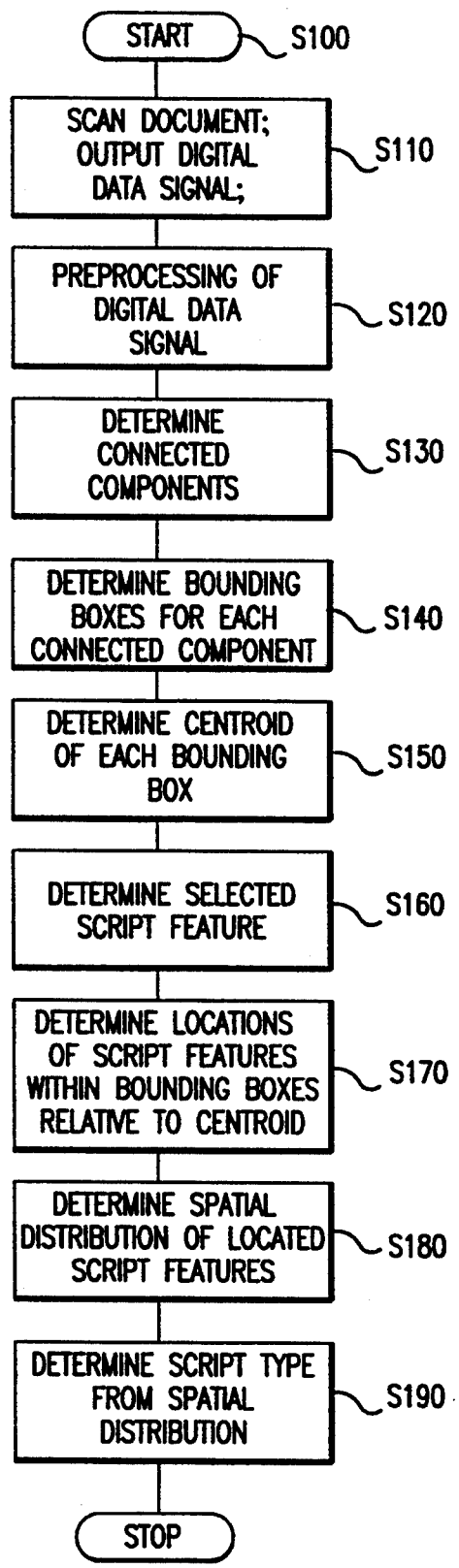
FIG. 8 shows a flow chart of the preferred method of the present invention.

A simplified flowchart of the operation of the script determining system set forth above is shown in FIG. 8. In step S100, the system starts, and the document is scanned in step S110 to generate the digital data signal. The digital image data signal is then cleaned-up by applying any desired preprocessing algorithms to the digital image data signal in step S120. In step 130, the connected components of the digital image data signal are identified and in step S140, the bounding boxes for each of the determined connected components are determined. In step 150, the centroid for each of the bounding boxes is determined and in step 160, at least one script feature is selected from a list of a predetermined script feature. Then, in step 170, the presence and location relative to the centroid of the corresponding bounding box for each located script feature is determined. Then, in step 180, the spatial distribution of the located script features relative to the centroid is determined. Finally, the script type is determined from the determined spatial distribution in step S190.

While the invention has been described with reference to particular preferred embodiments, the invention is not limited to the specific examples given, and other embodiments and modifications can be made by those skilled in the art without the departing from spirit and scope of the invention and claims.

What is claimed is:

1. An automatic script determining apparatus for determining a script-type of a script text portion of an image on a document, the script text portion including alphanumeric elements, phonetic elements, ideographic elements or pictographic elements, the script text portion comprising a plurality of characters, the apparatus comprising:

a scanner for scanning the script text portion and outputting a digital data signal representative of the script text portion, the digital data signal comprising a plurality of signal portions, each signal portion comprising data representative of a corresponding one of the plurality of pixels of the script text portion;

a memory for storing the digital data signal; and a controller for determining the script-type of the script text portion of the image, comprising:

connected component generating means for determining a plurality of connected components from the plurality of signal portions, each character of the script text portion comprising at least one of the plurality of connecting components;

bounding box determining means for determining a corresponding bounding box around the plurality of signal portions for each one of the plurality of connected components;

centroid determining means for determining a centroid of each corresponding bounding box;

feature determining means for locating script features, corresponding to at least one predetermined type of script feature, for each corresponding bounding box;

spatial distribution determining means for determining a spatial distribution of the located script features of the plurality connected components;

comparison means for comparing the determined spatial distribution to predetermined spatial distributions; and output means for outputting a signal indicative of a determined script type of the script text portion of the document.

2. The automatic script determining apparatus of claim 1, wherein the at least one predetermined type of script feature comprises at least one of concavities, black passes, white passes, black and white passes, shape measures, connected component populations, bounding box aspect ratios, bounding box area populations, connected component positions and connected component projection profiles.

3. The automatic script determining apparatus of claim 1, wherein the at least one predetermined type of script feature is upward opening concavities.

4. The automatic script determining apparatus of claim 3, wherein the spatial distribution determining means determines a vertical distribution of the upward opening concavities of the text portion relative to each corresponding bounding box.

5. The automatic script determining apparatus of claim 3, wherein the spatial distribution determining means determines the vertical distribution of the upward opening concavities relative to the centroid of a corresponding one of the plurality of bounding boxes.

6. The automatic script determining apparatus of claim 1, wherein the at least one predetermined type of script feature is black passes.

7. The automatic script determining apparatus of claim 6, wherein the spatial distribution determining means determines a vertical distribution of the black passes relative to the corresponding bounding box for each connected component.

8. The automatic script determining apparatus of claim 7, wherein the spatial distribution determining means determines the vertical distribution of the black passes relative to the centroid of each bounding box.

9. The automatic script determining apparatus of claim 1, wherein the spatial distribution determining means determines spatial distribution of the at least one predetermined script feature relative to the corresponding bounding box for each connected component.

10. The automatic script determining apparatus of claim 9, wherein the spatial distribution determining means determines spatial distribution of the at least one predetermined script feature relative to the centroid of the corresponding bounding box.

11. An automatic script determining apparatus for determining a script-type of a script of a document, the script including alphanumeric elements, phonetic elements, ideographic elements or pictographic elements, the document comprising an image comprising a plurality of pixels and having a text portion, the text portion comprising a plurality of characters, the apparatus comprising:

input means for inputting a digital data signal representative of the text portion, the digital data signal comprising a plurality of signal portions, each portion corresponding to one of the plurality of pixels;

connected component generating means for generating a plurality of connected components from the plurality of signal portions, each character of the text portion comprising at least one of the plurality of connected components;

feature determining means for identifying script features within the text portion, corresponding to at least one predetermined type of script feature, based on the plurality of connected components; and script determining means for comparing a distribution of the identified script features with at least one predetermined script feature distribution and determining the script type of the text portion based on the comparison.

12. The automatic script determining apparatus of claim 11, wherein the at least one predetermined script feature is upward opening concavities in the plurality of connected components.

13. The automatic script determining apparatus of claim 11, wherein the feature determining means comprises:
    a bounding box determining means for determining a bounding box of the plurality of signal portions for each one of the plurality of connected components.

14. The automatic script determining apparatus of claim 13, wherein the at least one predetermined script feature is black passes in the bounding boxes of the a plurality of connected components.

15. The automatic script determining apparatus of claim 13, wherein the feature determining means further comprises:
    a centroid determining means for determining a centroid for each bounding box; and
    feature locating means for locating the identified script features within each bounding box relative to the centroid of each bounding box.

16. The automatic script determining apparatus of claim 15, wherein the script determining means comprises a spatial distribution means for determining a spatial distribution of the located features normalized to the centroid.

17. The automatic script determining apparatus of claim 16, wherein the at least one predetermined script feature comprises upwardly facing concavities in the plurality of connected components.

18. The automatics script determining apparatus of claim 16, wherein the at least one predetermined script feature comprises black passes in the bounding boxes of the plurality of connected components.

19. The automatic script determining apparatus of claim 11, wherein the at least one predetermined script feature comprises at least one of connected component concavities, black passes, white passes, black and white passes, shape measures, connected component populations, bounding box aspect ratios, bounding box area populations, connected component positions and connected component projection profiles.

20. A method for automatically determining a script-type of a script text portion of a document, the script text portion including alphanumeric elements, phonetic elements, ideographic elements or pictographic elements, the script text portion comprising a plurality of characters, the method comprising the steps of:
    determining a plurality of connected components from a plurality of pixels comprising the script text portion, each character of the script text portion comprising at least one of the plurality of connected components;
    determining locations of script features of the script text portion based on the plurality of connected components corresponding to at least one preselected type of script feature;
    comparing a spatial distribution of the located script features with at least one predetermined script feature spatial distribution; and
    determining the script-type based on the comparison of the comparison step.

21. The method for automatically determining the script type of claim 21, wherein the at least one preselected script feature is upward facing concavities in the bounding boxes.

22. The method for automatically determining the script type of claim 20, wherein the step of determining locations of script feature comprising the steps of
    determining, for each one of the plurality of connected components, a corresponding bounding box enclosing each said one connected component;
    determining a centroid for each corresponding bounding box; and
    locating the script features of each one of the plurality of connected components relative to the centroid for the corresponding bounding box.

23. The method for automatically determining the script-type of claim 22, wherein the at least one preselected script feature is black passes in each corresponding bounding box.

24. The method for automatically determining the script-type of claim 20, further comprising the step of selecting, as the at least one preselected script feature, at least one script feature from the group comprising connected component concavities, black passes, white passes, black and white passes, shape measures, connected component populations, bounding box aspect ratios, bounding box area populations, connected component positions and connected component projection profiles.

* * * * *